May 25, 1926.
E. H. GOVE
FLUSH VALVE FOR WATER CLOSETS
Filed May 10, 1922
1,586,193
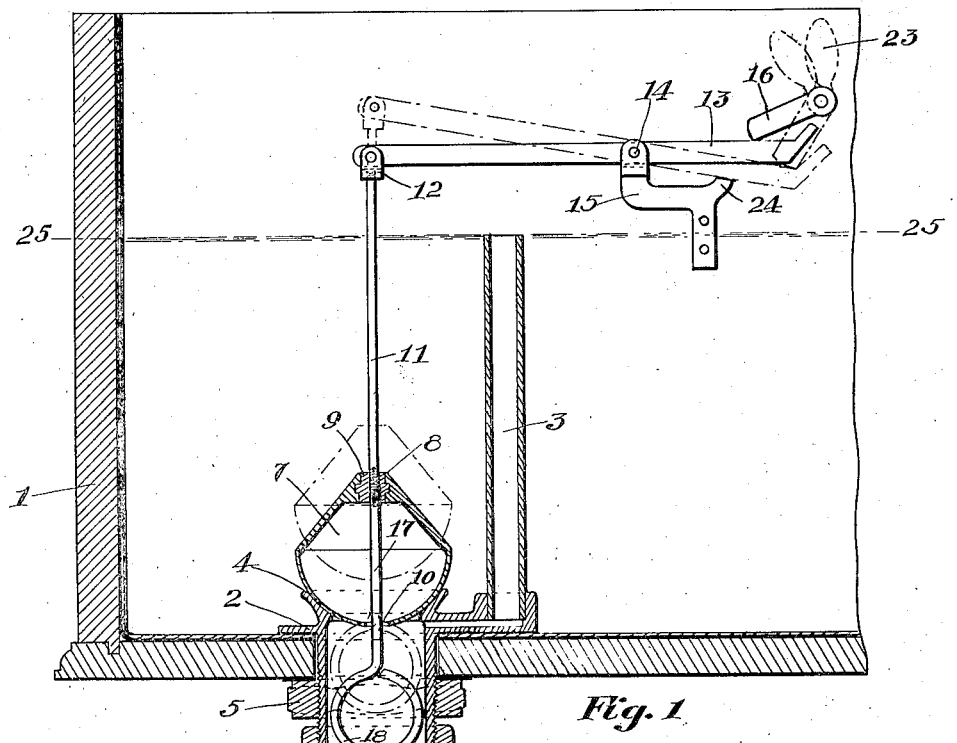
Fig. 1
Fig. 2
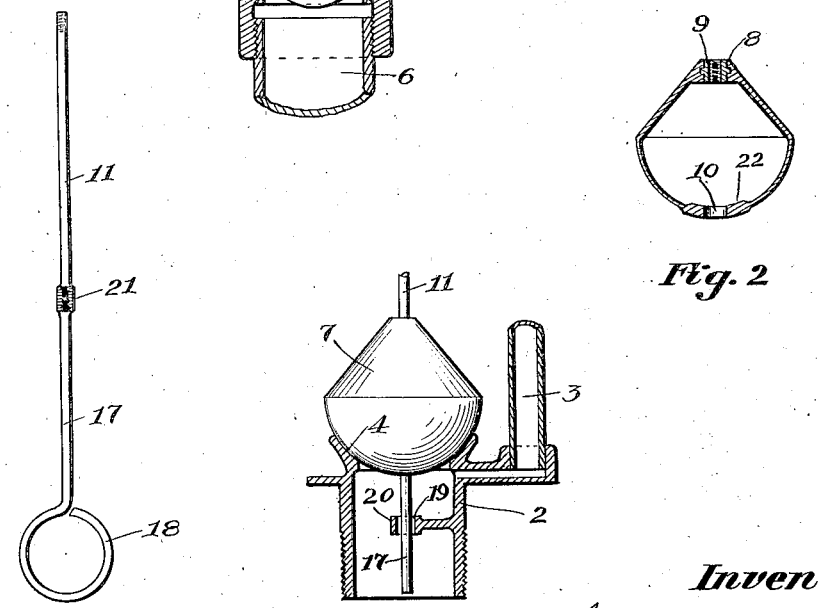
Fig. 3
Fig. 4
Inventor.
Edward H. Gove Patented May 25, 1926.

1,586,193

UNITED STATES PATENT OFFICE.

EDWARD H. GOVE, OF BIDDEFORD, MAINE.

FLUSH VALVE FOR WATER-CLOSETS.

Application filed May 10, 1922. Serial No. 559,787.

My invention relates to improvements in the valve, with its connecting parts, used in the flush tank of a water-closet set, which valve is ordinarily called a "flush" valve, and is used, in connection with the tank, to release a supply of water held in reserve in said tank to flush a water-closet when occasion requires it. In general appearance it resembles the old conventional style of hollow rubber valve, for which I lay no claim to novelty. I have, however, been able to improve in several details on this old type valve, and more especially in those features of its construction which have to do with its operation when closing, or shutting off the supply of water from tank to water-closet, after latter has been flushed.

In the earlier styles the guiding of valve into its seat was accomplished by guide members placed wholly above the valve, and often failed to accomplish the object for which they were intended. Necessarily a certain amount of slackness in the fits and joints of the guiding devices is required, but when these guides are all placed above the valve this slackness greatly aggravates the difficulty of getting the valve truly located in the valve seat.

In the construction of my valve with its co-related parts a certain amount of freedom or side-play to spindles is permissible, for the perfect seating of the valve is insured by reason of the fact that I provide guiding means, both above and below the valve, thereby preventing any "cocking" or tilting of the valve alignment with its seat when descending on same. In consequence my valve will have the advantage of always being tight, and by preventing the slow leaks so often found in the ordinary type of flush valve will be less expensive to maintain on account of the saving of water and the cost of up-keep of the system.

In the drawing accompanying this specification Fig. 1 is a sectional view of the complete valve and operating mechanism, shown assembled in a flush tank; Fig. 2 is a modified form of flush valve, in section; Fig. 3 is a modified form of valve spindle; Fig. 4 is a sectional view of spud member with valve seated in same, showing modification of lower guide for spindle.

Similar numerals refer to similar parts throughout the several views.

In Fig. 1, 1 represents part of a flush tank, in section, 2 is a spud, or outlet connection, and 3 is the overflow pipe. Valve seat is shown at 4, lock-nut, for spud, at 5 and flush pipe from tank to water-closet at 6. Seat 4 is made of a shape to conform to that of the lower portion of the flush valve 7, which is hemispherical; the upper portion of valve is much stiffer or less pliable than the lower and preferably made cone shape. Two holes open out of the axis of valve (at top and bottom), the upper one at 8 having an internally threaded bushing 9 inserted in same; the lower hole, 10, is a very loose fit over a spindle protruding therefrom.

Extending upwardly from bushing 9 is a spindle 11, threaded on its lower end and screwed rigidly into bushing 9. The upper end of spindle 11 is also threaded and screwed into a yoke 12, the latter pivotally attached to a lever 13 which is fulcrumed on pin 14 in bracket 15. The outward end of 13 has a bent up portion serving as a stop to arm 16 when latter is being operated to lift valve. Extending downwardly from out of bushing 9 is a spindle 17, the lower end of which is formed into a loop 18, which loosely fills cylindrical portion of spud 2, below valve seat. This loop, 18, serves as a guiding member to valve, its action being confined by the wall of the spud and restricted to proper and allowable limits of side-sway of spindle,—also of valve.

I also show at Fig. 4 a modification of this lower guide, the spindle 17 sliding loosely in a hole 19, in arm 20, extending out from wall of spud to central portion of space in same. The spindles 11 and 17 may be made integral, as seen in Fig. 3, and the same purpose will be served. The enlarged threaded portion at 21 will be screwed up into the bushing 9 and the lower end made with either a loop guide or as seen in Fig. 4.

It often happens with the old style valve that hole 10 becomes enlarged or split from constant use and weakening the hemispherical portion of the valve prevents its proper and water tight seating on valve seat 4. I have provided a remedy for this defect by surrounding this hole with a reinforcement as seen in Fig. 2, in which 22 represents a thickened portion around hole 10.

In operation, knob or handle 23, placed outside of flush tank, is swung over, depressing arm 16 on to lever 13, consequently raising the end of latter where it is connected with yoke 12, and lifting valve 7 off of seat 4. After valve clears itself from the seat it has a tendency to float and would naturally rise to surface of water were it not restrained by lever 13 abutting on stop 24 on bracket 15. It does, however, rise to position shown in dot-and-dash lines, Fig. 1, where it remains until water in tank has lowered from normal water-line 25—25, Fig. 1, to level of valve, which has up to this time been suspended in the water.

It now floats on surface of water and as latter continues to recede, the valve finally drops into its seat in spud, sealing this opening while a new supply of water enters tank by opening of float valve through proper mechanism (neither valve or mechanism being shown in drawing) which may be of any conventional type ordinarily used for this purpose.

Having thus described my invention, I claim:

1. In a flush-valve for water-closets, comprising in combination, a buoyant valve connected by a one-piece valve spindle to the lifting lever for said valve and a member depending axially of and from said valve into the water way below the seat for said valve and terminating in a ring vertically disposed within the said water-way.

2. In a flush-valve for water-closets, comprising in combination, a buoyant valve, a straight one-piece valve spindle extending from said valve to a pivotal connection with the lifting-lever therefor, a straight spindle depending axially from said valve into the water-way below the valve-seat for said valve and terminating in a vertical ring and means whereby said ring shall operate at all times below the said valve seat.

EDWARD H. GOVE.